US010132243B2

(12) United States Patent
Jorgensen et al.

(10) Patent No.: US 10,132,243 B2
(45) Date of Patent: Nov. 20, 2018

(54) MOUNTING AND DISMOUNTING DEVICE FOR A LINER OF A GAS TURBINE AND A RELATED METHOD

(71) Applicant: ANSALDO ENERGIA SWITZERLAND AG, Baden (CH)

(72) Inventors: Stephen Wilder Jorgensen, Palm City, FL (US); Joshua R. McNally, Jupiter, FL (US); Heinz Gerber, Baden (CH); Davide Aratori, Nussbaumen (CH); Douglas Anthony Pennel, Windisch (CH); Daniel Seng, Busslingen (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 432 days.

(21) Appl. No.: 15/068,294

(22) Filed: Mar. 11, 2016

(65) Prior Publication Data

US 2016/0265440 A1 Sep. 15, 2016

(30) Foreign Application Priority Data

Mar. 12, 2015 (EP) .................................... 15158897

(51) Int. Cl.
*F02C 7/20* (2006.01)
*F23R 3/60* (2006.01)

(52) U.S. Cl.
CPC .................. *F02C 7/20* (2013.01); *F23R 3/60* (2013.01); *F05D 2220/32* (2013.01); *F05D 2230/60* (2013.01); *F05D 2230/70* (2013.01)

(58) Field of Classification Search
CPC .......... F23R 3/60; F01D 25/28; F01D 25/285; F02C 7/20; F05D 2230/60; F05D 2230/64;
(Continued)

(56) References Cited

U.S. PATENT DOCUMENTS 5,911,680 A * 6/1999 Takeoka ................ F01D 25/285
431/154
6,141,862 A * 11/2000 Matsui .................. F01D 25/285
29/278
(Continued)

FOREIGN PATENT DOCUMENTS

EP 2236939 10/2010

OTHER PUBLICATIONS

Extended European Search Report dated Dec. 3, 2015, issued by the European Patent Office in the corresponding European Patent Application No. 15158897.7 (7 pages).

*Primary Examiner* — Craig Kim
(74) *Attorney, Agent, or Firm* — Buchanan Ingersoll & Rooney PC (57) ABSTRACT

A mounting and dismounting device for a liner of a gas turbine includes two inner rails attached at the turbine housing and each one having a first straight portion, two straight outer rails releasably attached at the turbine housing, wherein the adjacent free ends of the inner and outer rails can be positioned in full alignment one to the other. The rails are adapted to support the liner to be moveable in its axial direction. The inner rails include a second straight portion connected to the first straight portion through a curved portion wherein the axis of the second straight portion is parallel to the axis of the combustion gas passageway.

15 Claims, 10 Drawing Sheets

(58) Field of Classification Search
CPC ............. F05D 2230/68; F05D 2230/70; F05D 2230/72; F05D 2230/80
See application file for complete search history.

(56) References Cited

U.S. PATENT DOCUMENTS

| | | | |
|---|---|---|---|
| 9,140,142 B2* | 9/2015 | Shiotani | F01D 9/023 |
| 9,404,390 B2* | 8/2016 | Griese | F01D 25/285 |
| 2010/0038835 A1* | 2/2010 | Horiuchi | F01D 9/023 269/47 |
| 2011/0000080 A1* | 1/2011 | Arase | F01D 9/023 29/700 |
| 2012/0159955 A1 | 6/2012 | Shiotani et al. | |

* cited by examiner

MOUNTING AND DISMOUNTING DEVICE FOR A LINER OF A GAS TURBINE AND A RELATED METHOD

TECHNICAL FIELD

The present invention relates to mounting and dismounting devices for a liner of a gas turbine as well as to a method of mounting and dismounting a liner in a gas turbine.

PRIOR ART

US 2012/159955 A1 discloses a mounting and dismounting jig for so-called combustor tail pipes. The document shows a tail cylinder attaching and detaching fixture that attaches and detaches a tail cylinder to and from a casing, the tail cylinder being included in a combustor inserted into the casing so that the front end is connected to an inlet portion of a combustion gas passageway, the tail cylinder attaching and detaching fixture including: a guide portion of which the front end is arranged inside the casing and the front end and the base end are respectively supported by the casing and which supports the tail cylinder so as to be movable in the axial direction of the combustor; and an advancing and retracting mechanism that advances and retracts the tail cylinder in the axial direction.

US 2013/139368 A1 shows a similar member assembly apparatus based on the US 2012/159955 A1 disclosure with specific rails and attachment screws.

Circumferential pattern of can combustors and liner (hot gas components) in combination with a required accurate mounting position is a challenge for any maintenance process. In addition the considerable weight and size of each liner (hot gas component) affects the design of an accurate and safe apparatus for mounting or dismantling of liners (hot gas component). This maintenance process is a part of gas turbine outage time which is well defined time period and therefore shall be as shortest as possible in order to reduce operating costs.

The employment of standard lifting equipment as chains, ratchet lever hoists or crane hooks during maintenance operations is a highly risk activity according to EHS rules (environment, health and safety rules), especially for the lower half can combustor locations.

SUMMARY OF THE INVENTION

Based on the prior art it is an object of the patent to provide an apparatus for full replacement of intermediate pieces or liners as hot gas components in an improved safe manner.

An apparatus according to the invention is designed to safely support and guide a liner as hot gas component and accurately slide it in and out of the turbine housing. The turbine housing in this context is the housing of gas turbine including the part of the housing enclosing the combustor with burner, and combustion chamber comprising of liners, i.e. a section of the housing which is also called combustor housing. Here, also the turbine vane carrier can be considered as part of the turbine housing.

A main feature of a further embodiment of the invention is the curved rail at the inner end to first move the liner towards the gas turbine axis and then change the direction of the liner movement into an axial direction of the combustion passageway.

A mounting and dismounting device for a liner of a gas turbine is provided where the front end of the liner is to be connected or disconnected to an inlet portion of a combustion gas passageway. The inlet portion is the inlet to the turbine. It comprises two inner rails, arranged essentially parallel one to the other, each one attached at the turbine housing and each one having a first straight portion. There are two outer rails, arranged essentially parallel one to the other and releasably attached at the turbine housing. The adjacent free ends of the inner and outer rails can be positioned in full alignment one to the other, wherein the inner and outer rails are adapted to support the liner to be moveable in its axial direction. Then the inner rails comprise a second straight portion connected to the first straight portion through a curved portion. When installed the axis of the second straight portion is parallel to the axis of the inlet portion of the combustion gas passageway. Thus the axis is normal to a sealing surface of the liner outlet flange and the liner is moved onto the sealing surface in a direction substantially normal to the sealing surface.

Within such a device, the front free ends of the inner rails can be attached to the turbine housing, especially disposed in reception holes in the housing. Here, the front free ends are the ends furthest inside the casing and furthest away from the housing opening through which a burner can be installed. Furthermore, the base free ends of the inner rails can be attached to the turbine housing via connection plates. The outer rails can be attached at the housing via connection plates. Here, the base free ends are the ends at the housing opening through which a burner can be installed.

Such a device can comprise an advancing and retracting mechanism to advance and reject the liner along the inner and outer rails. This enhances EHS requirements and provides substantial help in view of the weight of usually more than 100 kg for each liner to be moved. Such a mechanism may comprise an actuation unit connected with the outer rails, a pulley to be attached to the turbine housing near the inlet portion of the combustion gas passageway, a cable or wire provided between said pulley and the actuation unit, and attachment elements to connect the cable or wire with the liner. Other advancing and retracting mechanism can be used together with other embodiments of the invention.

A further mounting and dismounting device for a liner of a gas turbine can be provided with some identical features of the above mentioned device. There the front end of the liner is to be connected or disconnected to an inlet portion of a combustion gas passageway. It comprises two inner rails, arranged essentially parallel one to the other, each one attached to the turbine housing and each one having a first straight portion. There are two outer rails, arranged essentially parallel one to the other and releasable attached to the turbine housing. The adjacent free ends of the inner and outer rails can be positioned in full alignment one to the other, wherein the inner and outer rails are adapted to support the liner to be moveable in its axial direction. The difference may start here, wherein such a device further comprises rotatable fixtures to be attached to the turbine housing, and that the two outer rails are fixedly attached to said rotatable fixtures allowing rotation of the free ends of the outer rails adjacent to the free ends of the inner rails between a first rotational position having full alignment of said free ends one to the other and a second rotational position, wherein the outer rails have a predetermined position to load and/or unload of the liner.

Such a solution allows, independent of the structure of the inner rails to provide the liner in the correct angular position, provided by the inclination of the plane spanned as a surface between the two parallel outer rails.

Such a device provides preferably a second rotational position as a position where the outer rails are positioned at the same height, i.e. the spanned plane is horizontal in view of a building ground, especially in view of a lifting machine providing the liner in a horizontal position near the intended liner opening.

Such a device can have the rotatable fixtures to be slidably positioned on a guiding bar in a non-detachable manner and said guiding bar is then being attachable in a detachable manner at the turbine housing. As an alternative the rotatable fixtures may be slidably positioned on a guiding bar in a detachable manner and said guiding bar is then fixedly attached to the turbine housing.

An actuation element of the rotatable fixtures can then engage turning elements connecting the guiding bar, wherein friction coatings or friction disks are provided between the actuation element and surfaces of the rotatable fixtures as well as between the rotatable fixtures and the guiding bar, whereas a breaking force defining screw optionally provided with a force exerting spring is provided between respective flange surfaces of the actuation element, the rotatable fixtures and the guiding bar.

Since the liner openings are usually a circle or an oval, the guiding bar can be a guiding ring provided at the circumference of the associated liner opening in the turbine housing.

The guiding bar can comprise a gear rod or a friction surface being engaged by one or more complementary gear wheels or friction wheels, respectively.

In order to better connect the free ends of the inner and outer guide rails, the free opposite ends of the inner rails and outer rails can be hollow, wherein one of the hollow ends in one of the rails comprise a positioning device for a connecting retractable pin comprising a spring pushing the pin in a specific length outside the associated free end to enable it to be inserted in the complementary hollow end of the associated other rail for a continuity connection between the rails. In such an embodiment the one hollow end in one rail can comprise a slit in the cylinder surface of the hollow end allowing retracting the retractable pin, optionally through a tool which can be engaged in an actuation slot in the pin.

Furthermore a method of mounting a liner in a gas turbine to connect it with an inlet portion of a combustion gas passageway can comprise the steps of:
positioning the liner in a predetermined position near the intended liner opening,
attaching the outer guide rails at the liner,
rotating the attachment fixtures connected with the guide rails (8) into a position to be fastened at the turbine casing,
fastening the attachment fixtures at the turbine casing,
rotating the outer guide rails with the attached liner supported by the attachment fixtures to align the inner free ends of the outer guide rails with adjacent free ends of the inner guide rails,
optionally connecting said free ends of inner rails and outer rails,
optionally connecting an advancing and retracting mechanism between liner and turbine casing, and
advancing the liner along the inner and outer rails to connect it with an inlet portion of the combustion gas passageway.

For the inverse procedure a method of dismounting a liner in a gas turbine connected with an inlet portion of a combustion gas passageway, comprises the steps of:
fastening the attachment fixtures at the turbine casing,
rotating the outer guide rails to align the inner free ends of the outer guide rails with adjacent free ends of the inner guide rails,
optionally connecting said free ends of inner rails and outer rails,
optionally connecting an advancing and retracting mechanism between liner and turbine casing,
retracting the liner along the inner and outer rails from the connection with an inlet portion of the combustion gas passageway, into a position where it is only positioned on the outer rails,
if the above mentioned optional connecting step had been used then disconnecting said free ends of inner rails from the free ends of the outer rails,
if the above mentioned optional disconnecting step had been used then disconnecting the advancing and retracting mechanism from the turbine casing,
rotating the attachment fixtures connected with the guide rails with the attached liner supported by the attachment fixtures into a position to dismount the liner in a predetermined angular position,
releasing the attachment fixtures from the turbine casing, and
releasing the liner in a predetermined position near the intended liner opening.

Finally a gas turbine may comprise a mounting and dismounting device for a liner comprising inner guide rails fixedly attached to the turbine housing and optionally comprising additional fixing means of an advancing and retracting mechanism as well as attachment means for the attachment fixture of the mounting and dismounting device.

The liner can be fixed to the device in a "horizontal direction" called first position (e.g. lowered on the device by a crane), the outer structure can then be turned depending on the liner position and the liner pushed into the casing with the right angular orientation to a second position.

Slots on the "mounting flange" and "picture frame flange" have two slots to allow the liner to move beyond the mounting ring connection.

Liner has to be moved towards the "picture frame flange" near the liner inlet end in axial direction to connect with a large surface portion of the outlet flange into a honeycomb seal.

The apparatus shall enable an EHS conform, fast and independent liner replacement and installation. It supports the entire weight of a liner during the different assembly or disassembly steps without external equipment. It comprises dedicated and form fit interfaces permitting to pick up and handle the liner in a safe way independently from the fact that it is used at the top or bottom of the engine. The apparatus takes into account the confined space between neighboring liners inside the engine and can combustors outside the engine as well as demands minimized supporting features on neighbor casings and in addition not colliding with nearby auxiliary systems. The apparatus has a modular design which fits with all the burner locations and also allows simultaneous maintenance operations.

Such an apparatus is usable during planned C and D inspections or during unplanned inspections as servicing one or several can combustors.

It is an advantage of the use of curved rails according to a further embodiment of the invention, that after having advanced the element along the axial longitudinal direction of the guide rail the last centimeters of the guide rail are guiding the front portion in a different direction from the longitudinal axis of the rails to enable the direct and axial contact of liner's outlet flange to inlet portion of the gas passageway. This allows for an improved contact of the front end with the inlet portion of the gas passageway, especially if there is a seal, e.g. a honeycomb seal.

An additional advantage of the guide rails according to a further embodiment of the invention is the fact that it can remain in the device since it just ends in front of the casing. For mounting inside the casing the liner is initially attached to separate guide rail pieces or outer guide rails which are attached at the casing for mounting or dismounting the liner. After attaching the liner to the outer guide rails the two guide rail portions are aligned with the guide rail portions fixed in the casing. The outer guide rail portion can be placed and moved away after servicing each of the different combustor casings.

It is a further advantage according to another embodiment of the invention when the outer guide rails are hollow at least in there front end portion next to the installed guide rails which are also hollow at least adjacent to the outer guide rails so that a connecting pin can be introduced from either end into the hollow part of the associated guide rail end so that a liner attached to the guide rails can be pushed along the then connected parts of the two-part guide rails.

A further advantage of a further embodiment of the invention is the turning unit attached to the outer guide rails. The fixture of said outer guide rails enables the service personnel to start with an attached liner or combustor casing on horizontally provided guide rails. Then in a mounting next step, these guide rails can be turned through actuating the turning unit around an axis which is in parallel to the main axis of the liner, i.e. the axis at the upstream section of the liner. This rotating of the liner mounted on the guide rails through turning one or both guide rails orients the free ends of the outer bars of the guide rails in front of the associated free ends of the inner bars, possibly with providing subsequently a form fit junction. Then an orientation or angle of the virtual connection line between the free ends of the outer bars is achieved allowing the combustor casing to be advanced into the turbine. This allows an easier servicing since the liner can be brought into the position to be taken over from the guide rails in a standard rail provided at every liner position around the contour without looking at an angle orientation.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
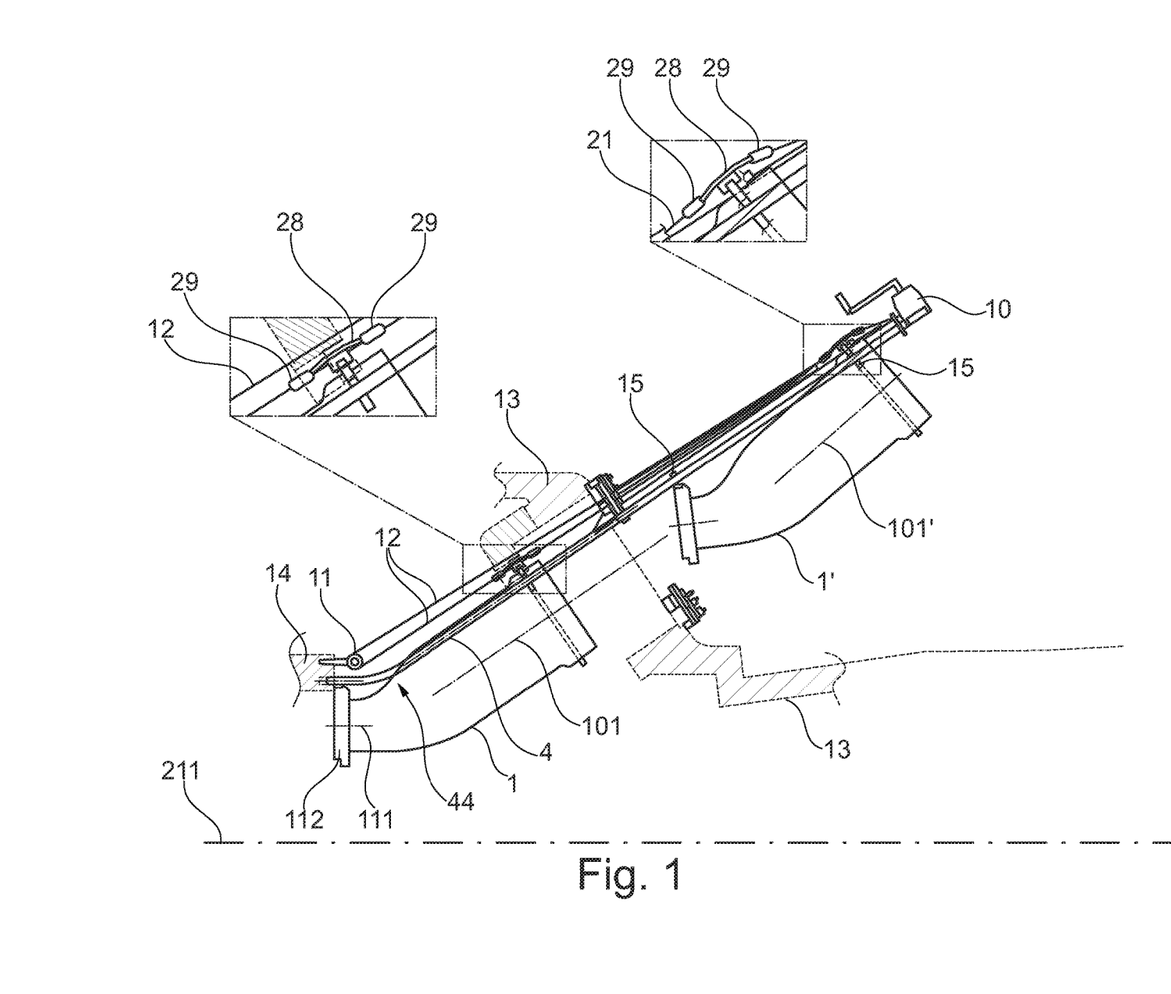
FIG. 1 shows a partial cross-section and side view of parts of a turbine, including two different positions of the same liner, as well as two enlargements of parts of a mounting and dismounting device according to an embodiment of the invention.

FIG. 1 shows a partial cross-section and side view of parts of a turbine with a liner 1 shown in two different positions to explain an embodiment of a mounting and dismounting device in different mounting/dismounting steps. The Fig. also comprises two enlargements of parts of the mounting and dismounting device.

The starting point of this invention is an engine in closed condition in which can combustors provided around a rotational contour had been removed and the liner 1 is still in place. The main target of the invention is to provide an easy method to disassemble one liner 1 (one after the other) out from its working location (shown with the liner 1) and after service to move it back to a repository area. The liner 1 in the outer position before taking it away has received the reference numeral 1'.

Figure 2:
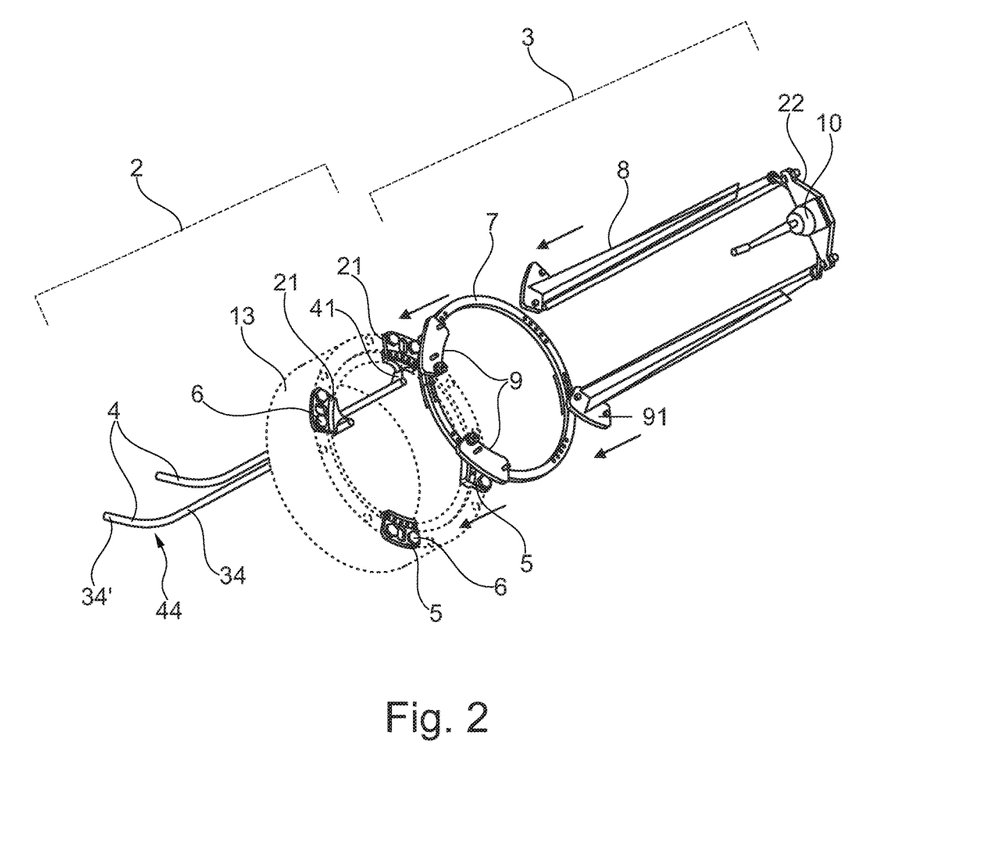
FIG. 2 shows a partial perspective view of parts of the mounting and dismounting device according to FIG. 1.

FIG. 2 shows a partial perspective view of parts of the mounting and dismounting device according to FIG. 1 with the turbine housing 13 in broken lines.

The device according to FIGS. 1 and 2 is composed of two main parts: an inner structure 2 and an outer structure 3. The inner structure 2 comprises two inner rails 4 which connect the turbine vane carrier 14 to the turbine housing 13. The inner rails 4 are preferably metallic rods or bars, which might be solid or hollow. Further features of the rails will be described later. In the present context it is important that the inner rails 4 are shaped in order to avoid collisions between the liner 1 contour and the turbine housing 13 and the neighboring liners in place. Each inner rail 4 comprises two essentially straight portions 34 and 34' which are connected with a curved portion 44. The upper and longer straight portion 34 is related to the main body of the liner 1 and is—in the operational position of the liner 1—parallel to the main liner axis 101. The lower and shorter straight portion 34' is related to the liner outlet flange 112 and is—in the operational position of the liner 1—parallel to the liner outlet axis 111. It is noted that the liner outlet axis 111 is oriented perpendicular to the main front surface of the liner outlet flange 112 and that the liner outlet axis 111 is parallel to the turbine axis 211. The angle between the two straight portions depend on the liner configuration and is e.g. between 10 and 30 degrees. The free ends of the shorter lower straight portions 34' are preferably lodged in holes in the turbine vane carrier 14 flange. When the inner rails 4 are fixed through bolts 6 at the housing 13, there is no specific additional need for a fixation in said holes in the turbine vane carrier 14.

Liner 1 comprises two dedicated form-fit holes 15 on both sides engaging these rails 4 of the lower structure 2 supporting and stabilizing it during the whole removal and assembly process. It is noted that the axis orientation 101' of the main longitudinal axis of the liner 1' in the outside position is different to the axis 101 as in the operational position of liner 1. This is due to the fact that the front attachment form-fit hole 15 of the liner has passed—on the way to the operational position—the curved portion 44 and has advanced on the shorter straight portion 34' in said different direction, pivoting the liner on its last centimeters of advance.

The outer structure 3 comprises two outer rails 8 bolted to single trolleys 9 movable on a guiding ring 7. The guiding ring 7 is circular. It may comprise two halves and is attached, e.g. bolted, to inner rail flanges 21 and clamping plates 5. Preferably, standard bolts are used to fasten the guiding ring 7 to the two inner rail flanges 21 and one or more clamping plates 5. Here two clamping plates 5 and short heavy-duty bolts 6 are used to fasten the inner rail flanges 21 and clamping plates 5 to the turbine housing 13. The heavy duty bolts are short to allow a quick and reliable fastening of the inner rail flanges 21. The bolt head is typically hexagonal and is also shortened in order to avoid collision with the trolley during its movement on the guiding ring 7. Each inner rail flange 21 comprises a trapezoid metal plate 41 attached at one edge at the longer straight portion 34 and with the opposite portion at the inner rail flange 21. Flanges 50 attached at the liner 1 comprise openings 51 to allow the flanges 50 of the liner 1 to pass the attachment position of the metal plates 41. The clamping plates 5 are just used to support and guide the guiding ring 7.

The guiding ring 7 shall be assembled as one piece together with the two trolleys 9 in order to save time during the engine maintenance. The inner rails 4 with the associated inner rail flanges 21 can be fixedly mounted on the turbine housing 13, so that the inner rails 4 remain mounted during operation of the turbine. The guiding ring 7 is concentric to the turbine housing 13, the holes provided on the exterior surface of the housing flange and to the liner 1 as well.

On the upper end of the outer rails 8 a bracket 22 holds a tackle/hoist 10. A metal wire 12 can be used to push/pull the liner 1 employing said tackle/hoist 10. As an alternative not shown in the drawings, also a chain blocks can be used as well. The tackle/hoist 10 is a self-breaking device and can be either hand or motor (electrical/pneumatic/hydraulic) driven. The metal wire 12 is hooked to the liner 1 and allows pushing/pulling it in and out from the engine. The liner 1 with the metal wire 12 can be hold through a block 28 hooked by carabiner 29 or by eyebolts bolted into dedicated holes 24 or via a ratchet belt tightened around the liner body.

A pulley 11 is used to roll up the metal wire 12 and changing the pull direction. This is needed during the liner 1 replacement in the lower half of the engine in order to hold the liner 1 against the gravity. The hole available for the pulley 11 in the turbine vane carrier 14 can be employed also for eyebolts or other lifting features needed during the maintenance. It is clear from the above description of the puling/pushing device that many different push and pull devices from the prior art can be used to move the liner 1 along the rail constructions according to an embodiment of the invention.

Figures 3A, 3B:
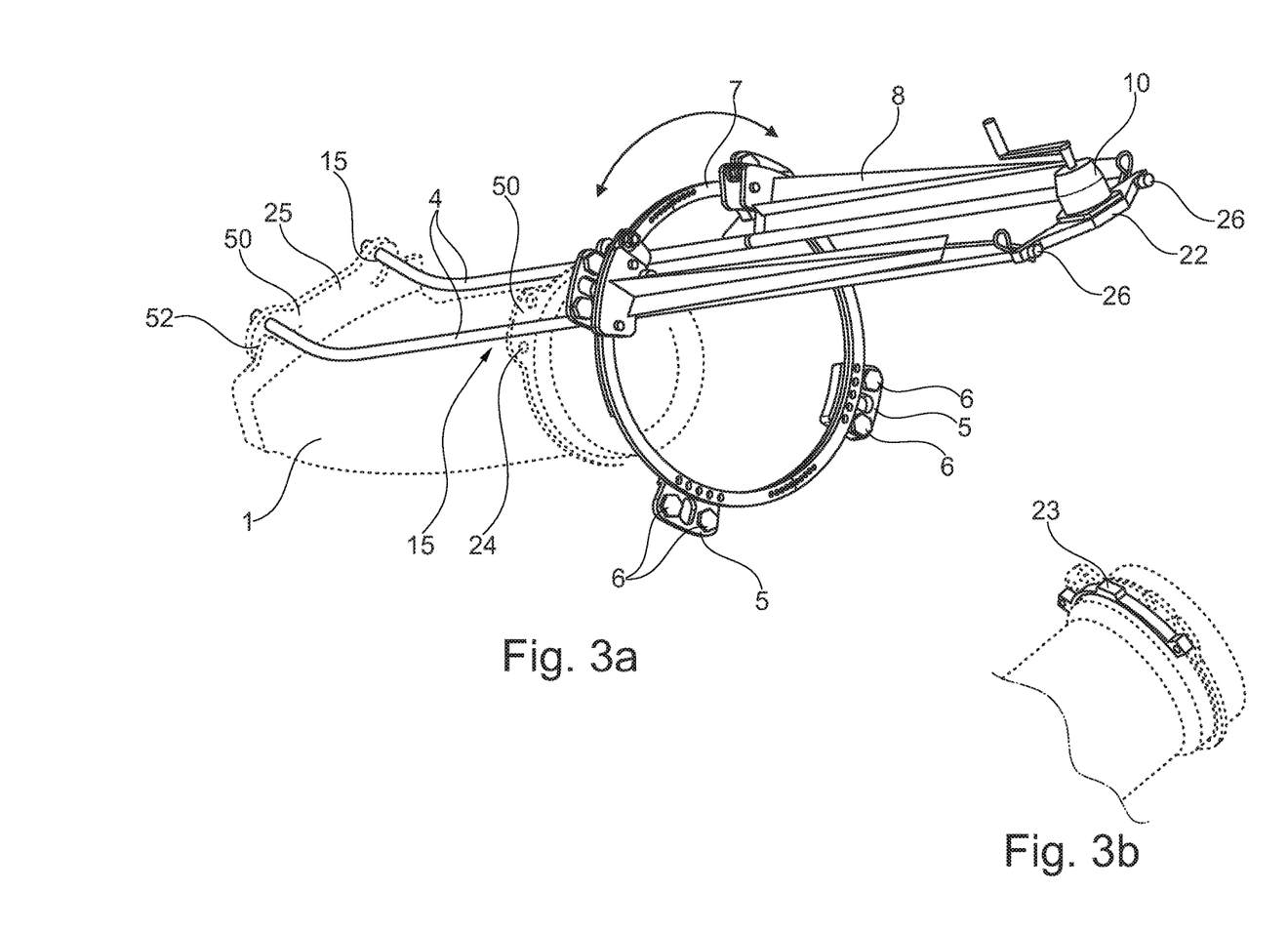
FIG. 3a shows a further perspective view of parts of the device according to the embodiment of FIG. 1 with elements of the liner in broken lines.
FIG. 3b shows part of the liner of FIG. 3a with a block attachment.

FIG. 3*a* shows a further perspective view of parts of the device according to the embodiment of FIG. 1 with elements of the liner 1 in broken lines. FIG. 3*b* shows part of the liner 1 in broken lines with a block attachment 23 on it. It can also be seen from FIG. 3*a* that liner 1 comprises at both ends of its structure a flange 50 having two receptions 15 each. Every reception 15 captures an inner rail 4 and maintains it below the inner rails 4. Inner rails 4 as well as outer rails 8 are of course parallel one to the other in a fixed predetermined distance. Slots 52 at the lower liner flange 50 are provided near the reception 15 in order to allow a spring action of the attachment.

Dedicated holes or welded blocks 24 or 25 on the liner 1 sides can be used to hook and push/pull it. Blocks 23 can be bolted to the hole 24 as additional lifting/grab features in connection with wire 12 and pulley 11 at the vane casing 14 opposite to hoist 10. Additional interface feature 25 permits to grab the Liner 1 on the other side. An example of a block 23 attached to the liner (indicated as dotted line) is shown in FIG. 3*b*.

Figure 4:
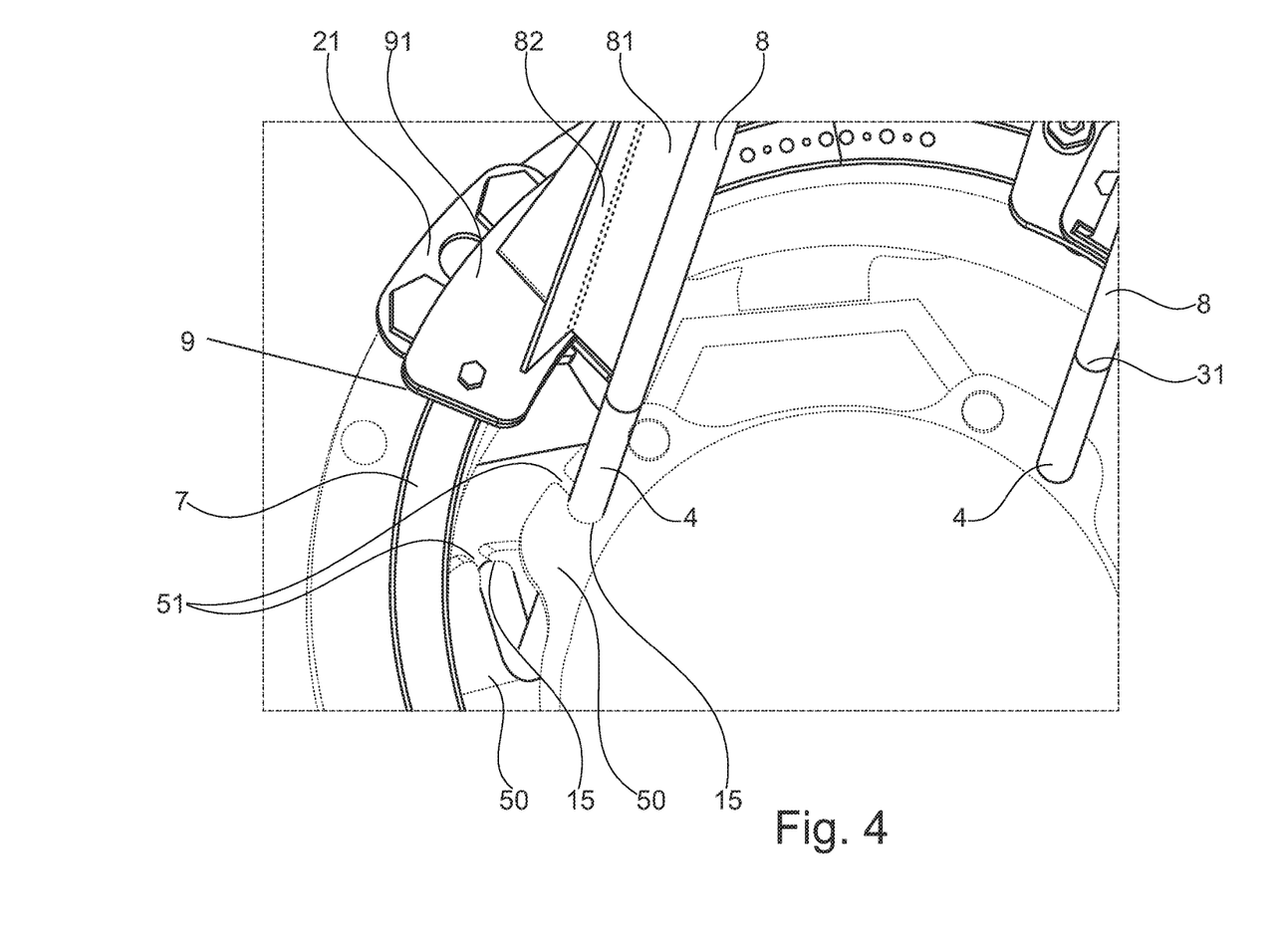
FIG. 4 shows parts of the inner and outer structure according to the embodiment of FIG. 1 with casing and liner parts in broken lines.

FIG. 4 shows parts of the inner 2 and outer 3 structure according to the embodiment of FIG. 1 with casing and liner parts in broken lines. The outer rails 8 comprise a metal connection plate 81 with one long edge connected, e.g. welded, to the outer rail 8, a crossing plate 82 connected to the connection plate 81 along a long side, and a rail end plate 91 wherein the inner shorter edge of the connecting plate 81 and the end of the crossing plate 82 is connected to the trolley 9 plate. The rail end plates 91 can for example be bolted to the trolleys 9.

The metal plate 81 is reinforced by further metal plates 81 providing a cross-like cross-section of this attachment at the plate 9. The metal plates 81, 82 are tapering out towards the external end of the outer rail 8.

The receptions 15 in the present embodiment are form-fit holes with an opening 51 in the traverse direction of the flange 50 and in the flange 50. It is also possible to provide open receptions with a diameter greater than the diameter of the rod of the inner rails 4 and a supplemental closing mechanism for the then larger opening 51 to a slit which just allows the passage of the connection plates 41 and 81.

In FIG. 4 it can be seen that the inner rails 4 and outer rails 8 are adjacent but nevertheless separated and the outer rail 8 is a separate extension of the inner rails 4. The rail continuity between the inner rails 4 and the outer rails 8 is ensured by the plug-in pins 20 explained in connection with FIG. 7*b*. These pins 20 can be accessed through a slit 31 provided in each outer rail 8.

Figure 5:
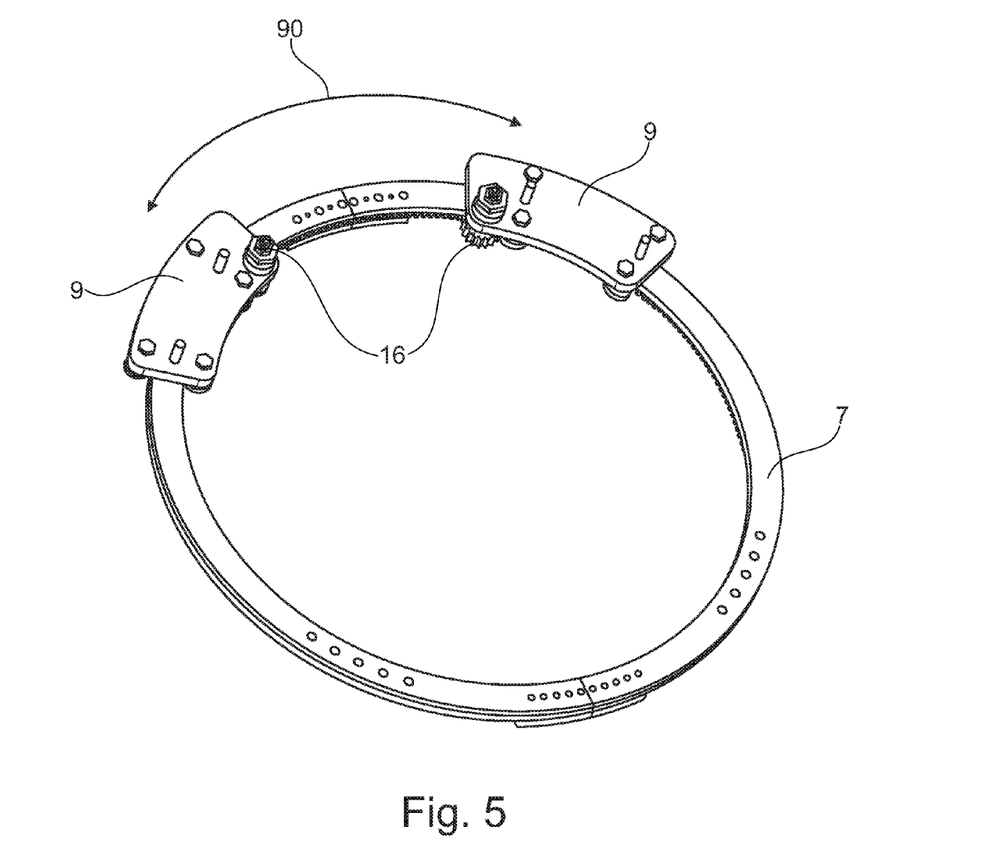
FIG. 5 shows the guiding ring 7 with trolley 9.

FIG. 5 shows the guiding ring 7 with trolleys 9. The trolleys 9 each hold a pinion 16 which engages the gears in the inner side of the guiding ring 7 as will be explained in connection with further drawings. Since the guiding ring 7 is attached to the casing 13, the trolleys 9 can rotate according to the double arrow 90, i.e. thus rotating the rails 8 around the center of the guiding ring 7 providing an inclination of the liner 1 attached with the form-fit holes 15 to the two outer rails 8.

Figure 6:
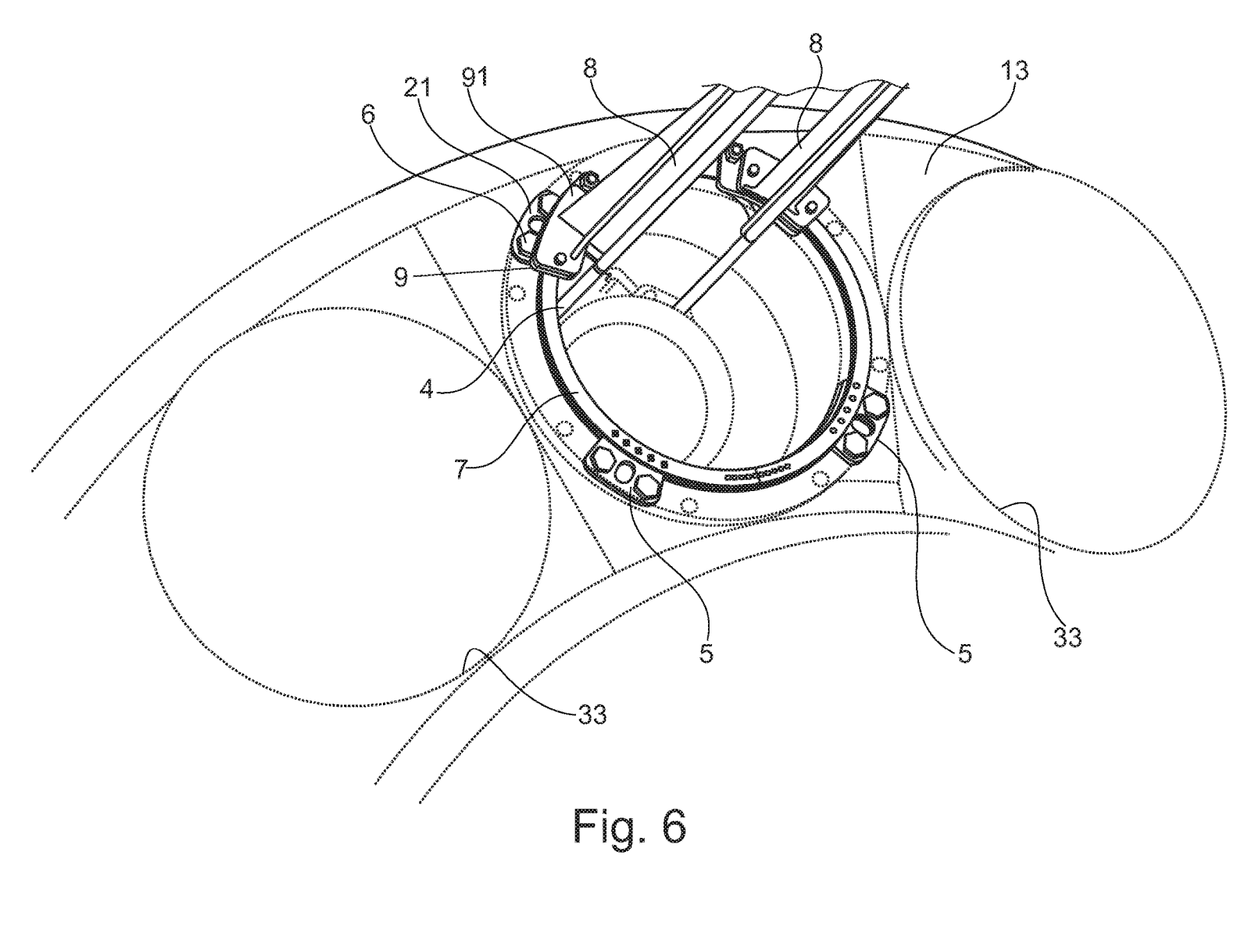
FIG. 6 shows the elements of FIGS. 4 and 5 mounted in a turbine housing with adjacent housing openings for further liners.

FIG. 6 shows the elements of FIGS. 4 and 5 mounted in a turbine housing 13 with adjacent housing openings 33 for further liners. The trolleys 9 are already rotated to a position where the adjacent free ends of outer rails 8 and inner rails 4 are aligned one with the other. Thus the liner 1 maintained in position through the form-fit holes 15 on outer rails 8 can be pushed onto the inner rails 4 and vice versa.

Figure 7A:
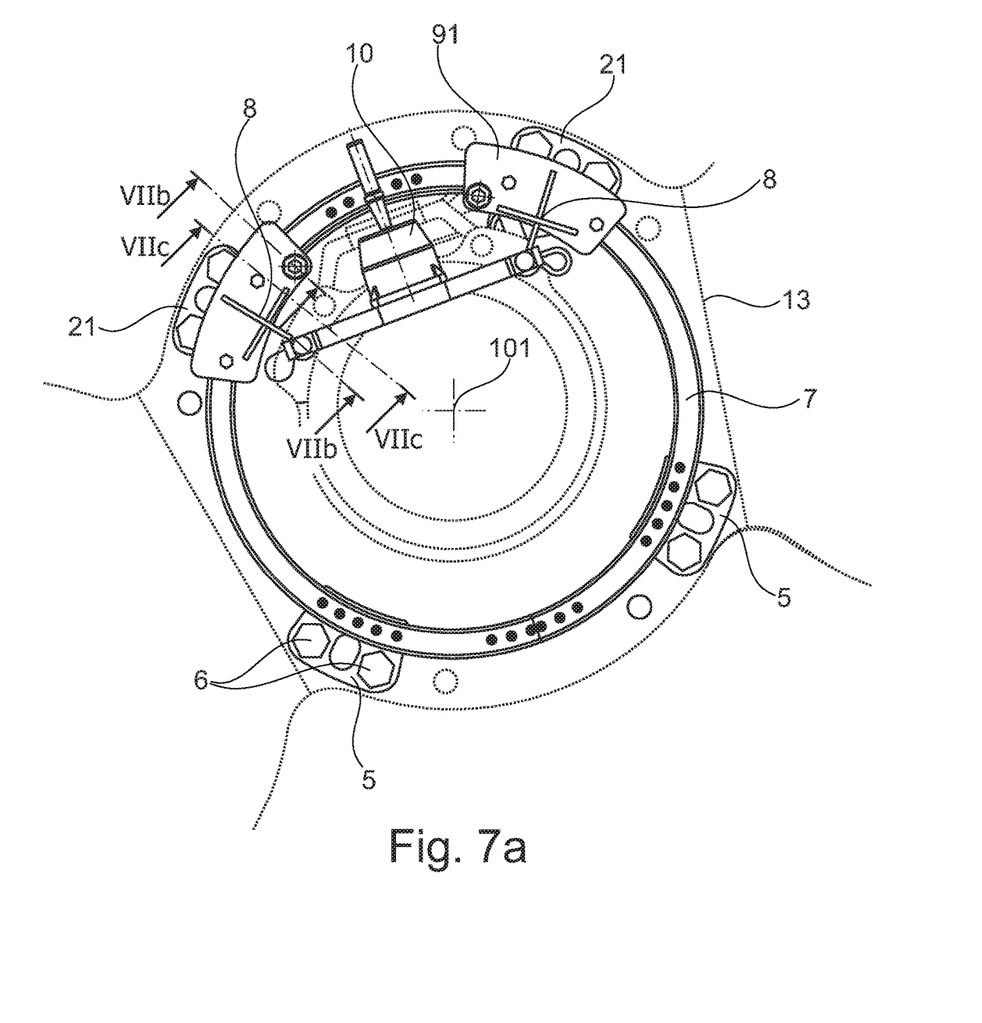
FIG. 7a shows a view in essentially the direction of the main liner axis of the elements of FIGS. 4 to 6.
Figure 7B:
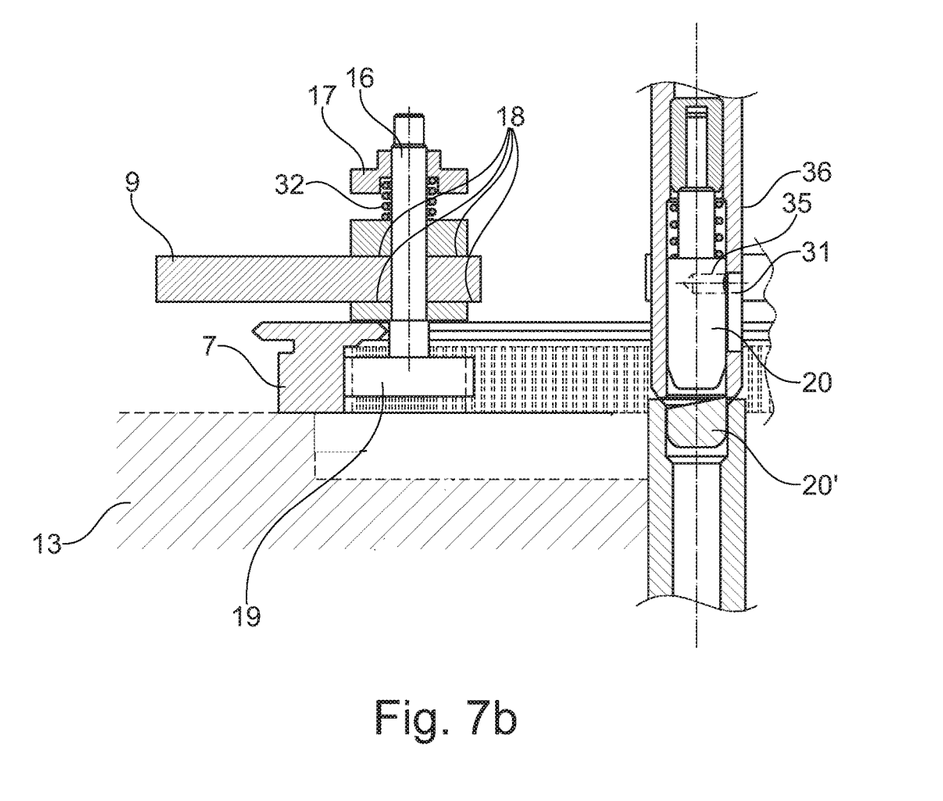
FIG. 7b shows a section along line VII b in FIG. 7a through the trolley and rail portion.
Figure 7C:
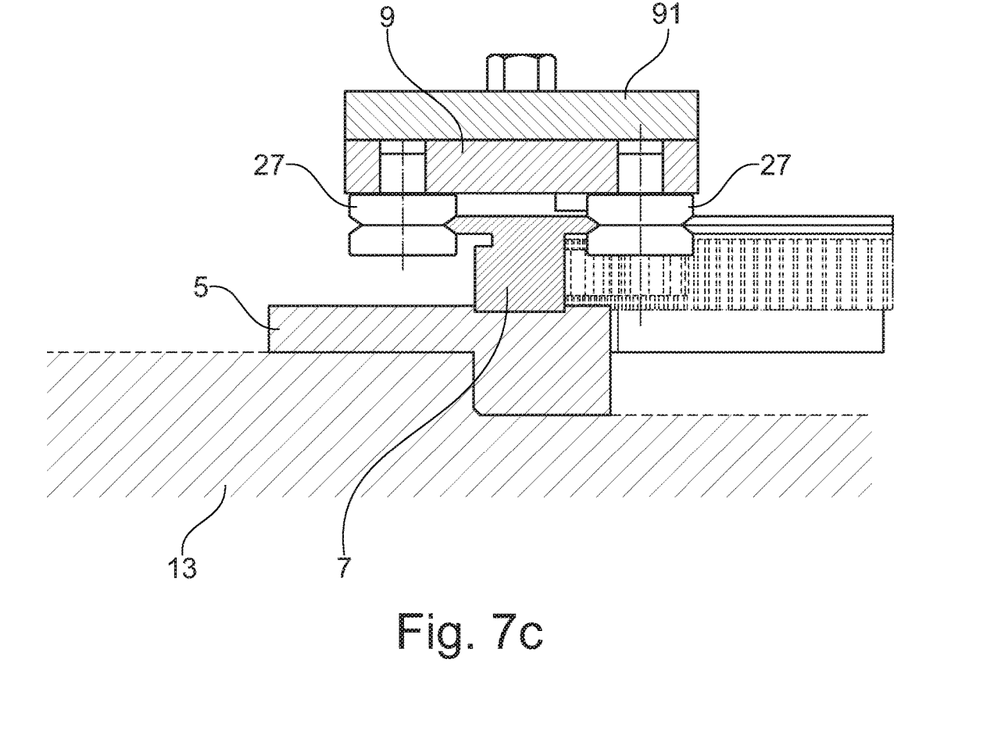
FIG. 7c shows a section along line VII c in FIG. 7a through the trolley and rail portion.

FIG. 7*a* shows a view essentially in the direction of the main liner axis 101 of the elements of FIGS. 4 to 6. It is noted that the cross showing axis 101 is related to the operational position of the liner 1. FIG. 7*b* shows a section along line VII b in FIG. 7*a* through the trolley and rail portion and FIG. 7*c* shows a different section along line VII c in FIG. 7*a* through the trolley and rail portion.

The trolleys 9 are movable all around on the guiding ring 7 fixed on casing 13 within the pair of rollers 27 which have form-fit shape according to the guiding ring 7 and engage the guiding ring 7 from opposite sides. The trolleys 9 each hold a pinion 16 which engages the gear wheels 19 in the inner side of the guiding ring 7. Through actuation of the pinion 16 the trolleys 9 together with the outer rails 8 and the liner 1 attached to the outer rails 8 can be turned just employing a standard spanner/ratchet combination. A high friction coating 18, e.g. sintered lining friction washer, allows blocking the trolley 9 at a predetermined angular position in view of the casing 13 keeping all the outer structure elements 3 in such a predetermined angular position. The special nut 17 positioned on the pinion 16 and pushing on a compression spring 32 permits adjusting the breaking force.

In other words, the guiding bar 7 comprises a gear rod being engaged by one or more complementary gear wheels 19. The friction wheels 27 maintain the trolley 9 positioned on the guiding bar 7. It is also possible that the pinion 16 directly engages friction wheels, similar to the friction wheels 27 for a direct engagement of the guiding ring 7 for rotating said ring 7.

A retractable pin 20 allows releasably connecting the outer rails 8 to the inner rails 4 in an accurate manner. Pins 20 with their rounded head will—upon alignment of the rails 8 in turning trolley 9 according to double arrow 90—retract against the force of actuation spring 35 in the hollow free end of rails 8 to find position of pin 20' upon alignment. Such pins are shown in that figure being retractable into the outer rails 8 but can also be provided to be retractable into the inner rails 2 as well.

Actuation slit 36 in pin 20 can be accessed through slit 31 in the hollow free end of outer rail 80 to push pin 20 back from its position 20' to rotate outer rails 8 from the alignment position to a reception/release position, i.e. once outside from the turbine housing 13 hole, the liner 1 can be turned and locked in any desired position. Such reception/release position is usually a horizontal position, i.e. the two outer rails 8 are at the same height to release the liner 1 on the rails 8 to be transported away from the turbine.

Figure 8:
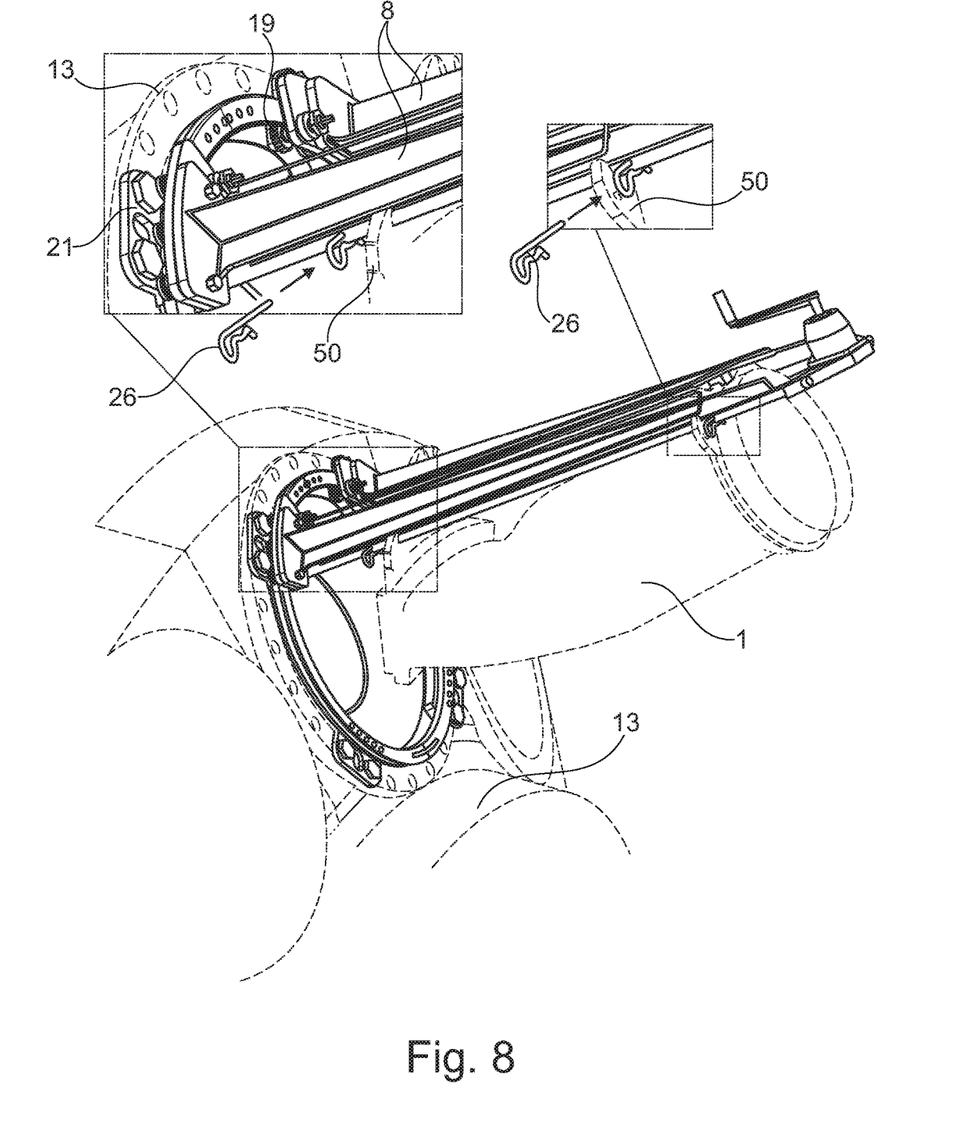
FIG. 8 shows a partial cross-section and perspective view of parts of the turbine, the liner and the device according to FIG. 1, including two enlargements of parts of a mounting and dismounting device.

Finally, FIG. 8 shows a partial cross-section and perspective view of parts of the turbine, the liner 1 and the device according to FIG. 1, including two enlargements of parts of a mounting and dismounting device.

The inner structure 2 and outer structure 3 shall be aligned during the removal until the liner 1 is shifted out from the engine just slipping on the rails. Once outside, the liner 1 is still oriented as the circumferential pattern of the can combustor and it is hold by the tackle/hoist 10 via the metal wire 12 or another lengthwise removal apparatus. R-Clips, hairpins/cotter pins or hitch pins can secure the liner 1 to the outer rails 8 and place it in the desired position. Therefore, specific transverse holes are provided within the outer rails 8 at specific distances just greater than required by the distance of the two flanges 50 of the liner 1.

The apparatus is intended to fit both with circular (FIG. 6) and oval (FIG. 7) burner holes. All the single parts are EHS compliant in terms of weight and can be handled by a single worker. During the removal/assembly the outer bars 8 stay with the liner 1 allowing a fast plug in to the trolleys 9 and to the guiding Ring 7.

A method operating the device for mounting a liner 1 in a gas turbine to connect it with an inlet portion of a combustion gas passageway comprises the steps of:
   positioning the liner 1 in a predetermined position near the intended liner opening,
   attaching the outer guide rails 8 to the liner 1,
   rotating the attachment fixtures 7, 9 connected with the guide rails 8 into a position to be fastened at the turbine casing 13,
   fastening the attachment fixtures (7, 9) at the turbine casing 13,
   rotating the outer guide rails 8 with the attached liner 1 supported by the attachment fixtures 7, 9 to align the inner free ends of the outer guide rails 8 with adjacent free ends of the inner guide rails 4,
   optionally connecting said free ends of inner rails 4 and outer rails 8,
   optionally connecting an advancing and retracting mechanism 10, 11, 12 between liner 1 and turbine casing 13, 14, and
   advancing the liner 1 along the inner and outer rails 4, 8 to connect it with an inlet portion of the combustion gas passageway.

Of course, a liner mounted according to the above mentioned method—or any other line, where it is possible to install the inner rails according to an embodiment of the invention—needs a method of dismounting a liner in a gas turbine connected with an inlet portion of a combustion gas passageway, comprising the steps of:
   fastening the attachment fixtures 7, 9 at the turbine casing,
   rotating the outer guide rails 8 to align the inner free ends of the outer guide rails 8 with adjacent free ends of the inner guide rails 4,
   optionally connecting said free ends of inner rails 4 and outer rails 8,
   optionally connecting an advancing and retracting mechanism 10, 11, 12 between liner 1 and turbine casing 13, 14,
   retracting the liner 1 along the inner and outer rails 4, 8 from the connection with an inlet portion of the combustion gas passageway, into a position where it is only positioned on the outer rails 8,
   optionally disconnecting said free ends of inner rails 4 from the free ends of the outer rails 8,
   optionally disconnecting the advancing and retracting mechanism 10, 11, 12 from the turbine casing 13, 14,
   rotating the attachment fixtures 7, 9 connected with the guide rails 8 with the attached liner 1 supported by the attachment fixtures 7, 9 into a position to dismount the liner 1 in a predetermined angular position,
   releasing the attachment fixtures 7, 9 from the turbine casing 13, and
   releasing the liner 1 in a predetermined position near the intended liner opening 33.

LIST OF REFERENCE SIGNS

1, 1' liner
2 inner structure
3 outer structure
4 inner rail
5 clamping plate
6 bolt
7 guiding ring
8 outer rail
9 trolley
10 tackle/hoist
11 pulley
12 metal wire
13 turbine housing
14 turbine vane carrier
15 form-fit hole
16 pinion
17 nut
18 friction coating
19 gear 20, 20' plug-in/retractable pin
21 inner rail flange
22 bracket
23 block
24 hole
25 block/interface
26 hairpin/cotter pin
27 roller
28 block
29 carabiner
31 slit
32 compression spring
33 adjacent housing opening
34, 34' straight portion
35 actuation slot
36 actuation spring
41 connection plate
44 curved portion
50 flange
51 opening
52 slot
81 connection plate
82 crossing plate
90 double arrow
101, 101' main liner axis
111 liner outlet axis
112 liner outlet flange
211 turbine axis

The invention claimed is:

1. A mounting and dismounting device for a liner of a gas turbine wherein a front end of the liner is to be connected or disconnected to an inlet portion of a combustion gas passageway, comprising:
two inner rails, arranged essentially parallel one to the other, each one attachable to the turbine housing and each one having a first straight portion, two outer rails, arranged essentially parallel one to the other and attachable to the turbine housing, wherein the adjacent free ends of the inner and outer rails are adjustably positioned to be in full alignment or out of full alignment one to the other, wherein the inner and outer rails are configured to support the liner to be moveable in its axial direction, wherein the inner rails include a second straight portion connected to the first straight portion through a curved portion.

2. The device according to claim 1, wherein the front free ends of the inner rails are attachable at the turbine housing, preferably to reception holes in the housing, and/or the base free ends of the inner rails are attachable to the turbine housing via connection plates.

3. The device according to claim 1, wherein the outer rails are attachable to the housing via connection plates.

4. The device according to claim 1, comprising:
an advancing and retracting mechanism to advance and reject the liner along the inner and outer rails;
an actuation unit connected with the outer rails;
a pulley to be attached at the turbine housing near the inlet portion of the combustion gas passageway;
a cable or wire provided between said pulley and the actuation unit and
attachment elements to connect the cable or wire with the liner.

5. A device according to claim 1, comprising:
rotatable fixtures to be attached at the turbine housing, the two outer rails being fixedly attached at said rotatable fixtures allowing rotation of the free ends of the outer rails adjacent to the free ends of the inner rails between a first rotational position having full alignment of said free ends one to the other and a second rotational position, wherein the outer rails have a predetermined position to load and/or unload of the liner.

6. The device according to claim 5, wherein the rotatable fixtures are slidably positioned on a guiding bar in a non-detachable manner and wherein said guiding bar is attachable in a detachable manner at the turbine housing.

7. The device according to claim 5, wherein the rotatable fixtures are slidably positioned on a guiding bar in a detachable manner and wherein said guiding bar is fixedly attached at the turbine housing.

8. The device according to claim 5, wherein an actuation element of the rotatable fixtures engages turning elements connecting the guiding bar, wherein friction coatings or friction disks are provided between the actuation element and surfaces of the rotatable fixtures as well as between the rotatable fixtures and the guiding bar, whereas a breaking force defining screw optionally provided with a force exerting spring is provided between respective flange surfaces of the actuation element, the rotatable fixtures and the guiding bar.

9. The device according to claim 5, wherein the guiding bar is a guiding ring provided at the circumference of the associated liner opening in the turbine housing.

10. The device according to claim 5, wherein the guiding bar comprises:
a gear rod or a friction surface engaged by one or more complementary gear wheels or friction wheels, respectively.

11. The device according to claim 1, wherein the free opposite ends of the inner rails and outer rails are hollow, wherein one of the hollow ends in one of the rails comprises:
a positioning device for a connecting retractable pin having a spring pushing the pin in a specific length outside the associated free end to enable it to be inserted in the complementary hollow end of the associated other rail for a continuity connection between the rails.

12. The device according to claim 11, wherein the one hollow end in one rail comprises:
a slit in the cylinder surface of the hollow end allowing retracting the retractable pin, optionally through a tool which can be engaged in an actuation slot in the pin.

13. A method of mounting a liner in a gas turbine to connect it with an inlet portion of a combustion gas passageway via a mounting device, wherein the mounting device includes two inner guide rails, arranged essentially parallel one to the other, each one attachable to the turbine housing and each one having a first straight portion, two outer guide rails, arranged essentially parallel one to the other and attachable to the turbine housing, wherein the adjacent free ends of the inner and outer guide rails can be positioned in full alignment one to the other, wherein the inner and outer guide rails are configured to support the liner to be moveable in its axial direction, wherein the inner rails include a second straight portion connected to the first straight portion through a curved portion, the method comprising:
positioning the liner in a predetermined position near an intended liner opening,
attaching the outer guide rails at the liner,
rotating the attachment fixtures connected with the guide rails into a position to be fastened at the turbine casing,
fastening the attachment fixtures at the turbine casing, rotating the outer guide rails with the attached liner supported by the attachment fixtures to align the inner free ends of the outer guide rails with adjacent free ends of the inner guide rails, optionally connecting said free ends of inner guide rails and outer guide rails, optionally connecting an advancing and retracting mechanism between the liner and turbine casing, and advancing the liner along the inner and outer guide rails to connect it with an inlet portion of the combustion gas passageway.

14. A method of dismounting a liner in a gas turbine connected with an inlet portion of a combustion gas passageway via a dismounting device, wherein the dismounting device includes two inner guide rails, arranged essentially parallel one to the other, each one attachable to the turbine housing and each one having a first straight portion, two outer guide rails, arranged essentially parallel one to the other and attachable to the turbine housing, wherein the adjacent free ends of the inner and outer guide rails can be positioned in full alignment one to the other, wherein the inner and outer guide rails are configured to support the liner to be moveable in its axial direction, wherein the inner guide rails include a second straight portion connected to the first straight portion through a curved portion, the method comprising:

fastening the attachment fixtures at the turbine casing, rotating the outer guide rails to align the inner free ends of the outer guide rails with adjacent free ends of the inner guide rails, optionally connecting said free ends of inner guide rails and outer guide rails, optionally connecting an advancing and retracting mechanism between liner and turbine casing, retracting the liner along the inner and outer guide rails from the connection with an inlet portion of the combustion gas passageway, into a position where it is only positioned on the outer guide rails, optionally disconnecting said free ends of inner rails from the free ends of the outer guide rails, optionally disconnecting the advancing and retracting mechanism from the turbine casing, rotating the attachment fixtures connected with the guide rails with the attached liner-supported by the attachment fixtures into a position to dismount the liner in a predetermined angular position, releasing the attachment fixtures from the turbine casing, and releasing the liner in a predetermined position near the intended liner opening.

15. A gas turbine comprising:

a mounting and dismounting device for a liner having inner guide rails fixedly attached to the turbine housing via an attachment fixture, the attachment fixture including two inner rails, arranged essentially parallel one to the other, each one attachable to the turbine housing and each one having a first straight portion, two outer rails, arranged essentially parallel one to the other and attachable to the turbine housing, wherein the adjacent free ends of the inner and outer rails are aligned one to the other, wherein the inner rails include a second straight portion connected to the first straight portion through a curved portion, the mounting and dismounting device optionally comprising:

additional fixing means of an advancing and retracting mechanism as well as attachment means for the attachment fixture of the mounting and dismounting device.

* * * * *